US012627420B2

(12) United States Patent
Geletu et al.

(10) Patent No.: US 12,627,420 B2
(45) Date of Patent: May 12, 2026

(54) INTERPRETING MULTIPLEXED HARQ FEEDBACK DATA

(71) Applicant: Telefonaktiebolaget LM Ericsson (publ), Stockholm (SE)

(72) Inventors: Biruk Silase Geletu, Järfälla (SE); Diana Yamalova, Knivsta (SE); Ahmed Nouah, Ottawa (CA); Tariku Temesgen Mehari, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 18/274,272

(22) PCT Filed: Feb. 24, 2021

(86) PCT No.: PCT/SE2021/050155
§ 371 (c)(1),
(2) Date: Jul. 26, 2023

(87) PCT Pub. No.: WO2022/182271
PCT Pub. Date: Sep. 1, 2022

(65) Prior Publication Data
US 2024/0089036 A1     Mar. 14, 2024

(51) Int. Cl.
*H04L 1/1867*     (2023.01)
*H04L 1/1812*     (2023.01)
(Continued)

(52) U.S. Cl.
CPC .......... *H04L 1/1893* (2013.01); *H04L 1/1819* (2013.01); *H04L 1/1861* (2013.01); *H04L 5/0055* (2013.01)

(58) Field of Classification Search
CPC ... H04L 1/1893; H04L 1/1819; H04L 1/1861; H04L 5/0055; H04L 1/1864; H04L 2001/125
(Continued)

(56) References Cited

U.S. PATENT DOCUMENTS

2011/0090825 A1     4/2011  Papasakellariou et al.
2012/0076077 A1*    3/2012  Buckley ................ H04L 5/0055
                                            370/328
(Continued)

FOREIGN PATENT DOCUMENTS

EP          2418901 A2       2/2012
EP          2525542 A2       11/2012
EP          3624538 A1       3/2020
WO      2020084524 A1       4/2020

OTHER PUBLICATIONS

Samsung, "Further refinement on ACK/NACK multiplexing in TDD", R1-084163, Nov. 10-14, 2008. (From Applicant's IDS) (Year: 2008).*

(Continued)

*Primary Examiner* — Mang Hang Yeung
(74) *Attorney, Agent, or Firm* — Withrow & Terranova, PLLC

(57) ABSTRACT

The present disclosure relates to a method of a radio base station of interpreting multiplexed Hybrid Automatic Repeat Request (HARQ) feedback data received from a wireless communication device in response to a downlink transmission to the wireless communication device, and a radio base station performing the method.

20 Claims, 10 Drawing Sheets

(51) Int. Cl.
    *H04L 1/1829*       (2023.01)
    *H04L 5/00*        (2006.01)
(58) Field of Classification Search
    USPC ........................................................ 370/329
    See application file for complete search history.

(56) References Cited

U.S. PATENT DOCUMENTS

| | | | |
|---|---|---|---|
| 2015/0172022 A1 | 6/2015 | Guo et al. | |
| 2015/0189658 A1 | 7/2015 | Zhang et al. | |
| 2017/0295580 A1* | 10/2017 | Ji .......................... H04L 1/0003 | |
| 2018/0310257 A1* | 10/2018 | Papasakellariou .... H04W 52/08 | |
| 2020/0007296 A1 | 1/2020 | Papasakellariou et al. | |
| 2022/0217651 A1* | 7/2022 | Papasakellariou .. H04W 52/242 | |

OTHER PUBLICATIONS

Texas Instrument, "Correction on TDD ACK/NACK multiplexing mapping scheme for M=4", R1-084047 Sep. 29-Oct. 3, 2008. (From Applicant's IDS) (Year: 2008).*

Zte, "Considerations on BG Determination", R1-1719524, Nov. 27-Dec. 1, 2017. (From Applicant's IDS) (Year: 2017).*

Guangdong Oppo Mobile Telecom, "R1-1713279: Discussion on HARQ-ACK feedback for CBG-based transmission," 3GPP TSG RAN WG1 Meeting #90, Prague, Czech Republic, Aug. 21-25, 2017, 3 pages.

Samsung, "R1-084163: Further Refinement on ACK/NACK Multiplexing in TDD," 3GPP TSG RAN WG1 Meeting #55, Nov. 10-14, 2008, Prague, Czech Republic, 5 pages.

Texas Instruments, et al., "R1-084047: Correction on TDD ACK/NAK multiplexing mapping scheme for M=4," 3GPP TSG RAN WG1 #54bis, Sep. 29-Oct. 3, 2008, Prague, Czech Republic, 3 pages.

International Search Report and Written Opinion for International Patent Application No. PCT/SE2021/050155, mailed Nov. 9, 2021, 12 pages.

Zte, et al., "R1-1719524: Considerations on BG Determination," 3GPP TSG RAN WG1 Meeting #91, Nov. 27-Dec. 1, 2017, Reno, Nevada, 7 pages.

Extended European Search Report for European Patent Application No. 21928265.4, mailed Oct. 21, 2024, 9 pages.

\* cited by examiner

10

PUCCH

PUSCH

PDCCH

PDSCH

11

| Slot i | Slot j | Slot k | | Slot l |
|---|---|---|---|---|
| DL-DCI | PDSCH | DL-DCI | PDSCH | DL-DCI | PDSCH | | PUSCH/ PUCCH |
| DAI=0 | | DAI=1 | | DAI=2 | | | HARQ FEEDBACK |

| Slot i | Slot j | Slot k | | Slot l |
|---|---|---|---|---|
| DL-DCI | PDSCH | DL-DCI | PDSCH | DL-DCI | PDSCH | UL-DCI | | PUSCH/ PUCCH |
| DAI=0 | | DAI=1 | | DAI=2 | | DAI=3 | | HARQ FEEDBACK |

Part 1

| UE DCI Reception and PDSCH decoding status | | | | | | UE UL-DCI status | Multiplexed HARQ feedback set received at gNB | | | gNB Decision | | | Comments |
|---|---|---|---|---|---|---|---|---|---|---|---|---|---|
| DAI = 0 | | DAI = 1 | | DAI = 2 | | | | | | | | | |
| DL-DCI | PDSCH-CRC | DL-DCI | PDSCH-CRC | DL-DCI | PDSCH-CRC | | | | | | | | |
| R | OK | R | OK | R | OK | | ACK | ACK | ACK | REC | REC | REC | PUCCH Format for > 2 bits. |
| R | OK | R | OK | R | NOK | | ACK | ACK | NACK | REC | REC | REC | |
| R | OK | R/X | NOK | R | OK | | ACK | NACK | ACK | REC | AM | REC | AM: Ambiguous REC: Received (i.e. non-ambiguous) |
| R | OK | R/X | NOK | R | NOK | | ACK | NACK | NACK | REC | AM | REC | |
| R | NOK | R | OK | R | OK | | NACK | ACK | ACK | AM | REC | REC | |
| R | NOK | R | OK | R | NOK | | NACK | ACK | NACK | AM | REC | REC | |
| R | NOK | R/X | NOK | R | OK | | NACK | NACK | ACK | AM | AM | REC | |
| R | NOK | R/X | NOK | R | NOK | | NACK | NACK | NACK | AM | AM | REC | |

Part 2

| DL-DCI | PDSCH-CRC | DL-DCI | PDSCH-CRC | DL-DCI | PDSCH-CRC | UL-DCI | HARQ | gNB decision | | Comments |
|---|---|---|---|---|---|---|---|---|---|---|
| R | OK | R | OK | X | | | ACK | REC | REC | PUCCH Format for <=2 bits. |
| R | OK | X | | X | | | ACK | REC | DTX | |
| R | OK | R | NOK | X | | | ACK | REC | REC | |
| R/X | NOK | R | OK | X | | | NACK | AM | REC | |
| R/X | NOK | R | NOK | X | | | ACK | AM | REC | |
| R | NOK | X | | X | | | NACK | REC | DTX | |
| X | | X | | X | | | NACK | DTX | DTX | DTX: Lost DCI |

Fig. 4

| DL-DCI | PDSCH-CRC | DL-DCI | PDSCH-CRC | DL-DCI | PDSCH-CRC | UL-DCI | HARQ | | | gNB decision | | | Comments |
|---|---|---|---|---|---|---|---|---|---|---|---|---|---|
| R | OK | R | OK | R | OK | R | ACK | ACK | ACK | REC | REC | REC | |
| R | OK | R | OK | R | NOK | R | ACK | ACK | NACK | REC | REC | AM | |
| R | OK | R/X | X | R | OK | R | ACK | NACK | ACK | REC | AM | REC | |
| R | OK | R/X | X | R | NOK | R | ACK | NACK | NACK | REC | AM | AM | |
| R/X | X | R | OK | R | OK | R | NACK | ACK | ACK | AM | REC | REC | |
| R/X | X | R | OK | R | NOK | R | NACK | ACK | NACK | AM | REC | AM | UCI on PUSCH. |
| R/X | X | R/X | X | R | OK | R | NACK | NACK | ACK | AM | AM | REC | |
| R/X | X | R/X | X | R | NOK | R | NACK | NACK | NACK | AM | AM | AM | |

Table 2. UE DCI Reception and PDSCH decoding status for three DL-DCIs

Fig. 4 (cont'd)

| UE DCI Reception and PDSCH decoding status | | | | | | UE UL-DCI status | Multiplexed HARQ feedback set received at gNB | | | gNB Decision | | | Comments |
|---|---|---|---|---|---|---|---|---|---|---|---|---|---|
| DAI = 0 | | DAI = 1 | | DAI = 2 | | | | | | | | | |
| DL-DCI | PDSCH-CRC | DL-DCI | PDSCH-CRC | DL-DCI | PDSCH-CRC | | | | | | | | |
| X | NOK | X | NOK | R | OK | | NACK | NACK | ACK | AM | AM | REC | PUCCH Format for > 2 bits. |
| R | NOK | R | NOK | R | OK | | NACK | NACK | ACK | AM | AM | REC | PUCCH Format for > 2 bits. |
| R | OK | X | NOK | R | NOK | | ACK | NACK | NACK | REC | AM | REC | PUCCH Format for > 2 bits. |
| R | OK | R | NOK | X | X | | ACK | NACK | | REC | REC | DTX | PUCCH Format for <=2 bits. |
| R | OK | R | NOK | X | X | R | ACK | NACK | NACK | REC | AM | AM | UCI on PUSCH. |

Table 3. A subset of the UE DCI Reception and PDSCH decoding statused of Table 2.

Fig. 5

| UE DCI Reception and PDSCH decoding status | | | | | | UE UL-DCI status | Multiplexed HARQ feedback set received at gNB | | gNB Decision | | | Comments |
|---|---|---|---|---|---|---|---|---|---|---|---|---|
| DAI = 0 | | DAI = 1 | | DAI = 2 | | | | | | | | |
| DL-DCI | PDSCH-CRC | DL-DCI | PDSCH-CRC | DL-DCI | PDSCH-CRC | | | | AM | REC | DTX | |
| R | NOK | R | OK | R | OK/NOK | | NACK | ACK | AM | REC | DTX | |
| R | NOK | R | NOK | R | OK/NOK | | NACK | NACK | AM | REC | DTX | PUCCH Format for <=2 bits. |

Table 4. UE DCI Reception and PDSCH decoding status for three DL-DCIs taking into account decoding errors at the gNB due to channel imperfections.

Fig. 7

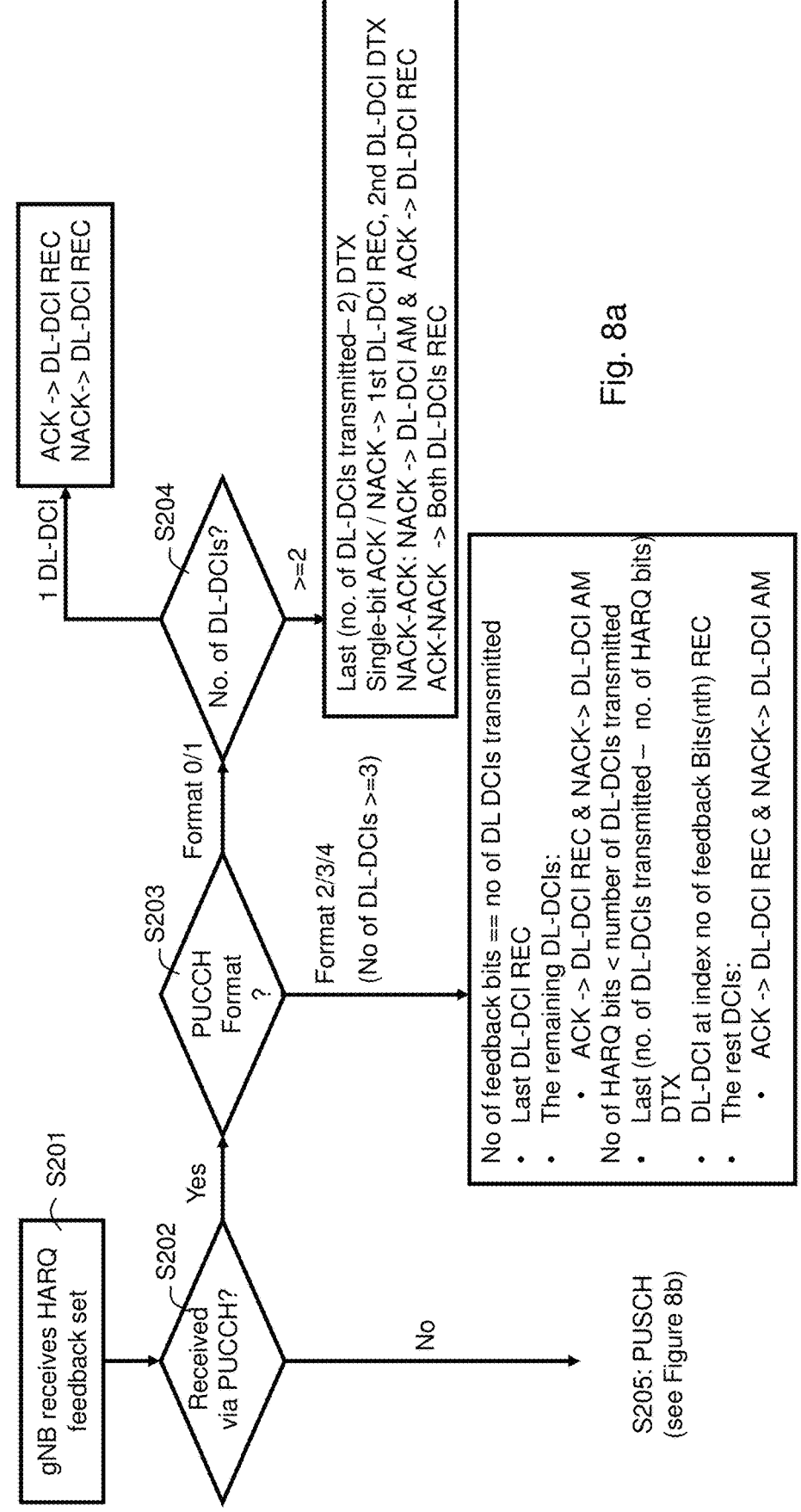

gNB receives HARQ feedback set — S201

S202 — Received via PUCCH?

Yes → S203 — PUCCH Format?

No → S205: PUSCH (see Figure 8b)

Format 0/1 → S204 — No. of DL-DCIs?

1 DL-DCI →
ACK -> DL-DCI REC
NACK-> DL-DCI REC

>=2 →
Last (no. of DL-DCIs transmitted– 2) DTX
Single-bit ACK / NACK -> 1st DL-DCI REC, 2nd DL-DCI DTX
NACK-ACK: NACK -> DL-DCI AM & ACK -> DL-DCI REC
ACK-NACK -> Both DL-DCIs REC Format 2/3/4 (No of DL-DCIs >=3) →
No of feedback bits == no of DL DCIs transmitted
• Last DL-DCI REC
• The remaining DL-DCIs:
  • ACK -> DL-DCI REC & NACK-> DL-DCI AM
No of HARQ bits < number of DL-DCIs transmitted
• Last (no. of DL-DCIs transmitted –  no. of HARQ bits) DTX
• DL-DCI at index no of feedback Bits(nth) REC
• The rest DCIs:
  • ACK -> DL-DCI REC & NACK-> DL-DCI AM

Fig. 8a

INTERPRETING MULTIPLEXED HARQ FEEDBACK DATA

This application is a 35 U.S.C. § 371 national phase filing of International Application No. PCT/SE2021/050155, filed Feb. 24, 2021, the disclosure of which is incorporated herein by reference in its entirety.

TECHNICAL FIELD

The present disclosure relates to a method of a radio base station of interpreting multiplexed Hybrid Automatic Repeat Request (HARQ) feedback data received from a wireless communication device in response to a downlink transmission to the wireless communication device, and a radio base station performing the method.

BACKGROUND

In cellular wireless systems, such as New Radio (NR) and Long Term Evolution (LTE) standards defined by 3rd Generation Partnership Project (3GPP), a mechanism referred to as Hybrid Automatic Repeat Request (HARQ) is used by wireless communication devices such as mobile phones to feedback decoding status of received transport blocks to a sender of the blocks being for instance a radio base station.

The HARQ enables fast retransmission of data by the radio base station if the decoding of the transport blocks at the wireless communication device is not successful. In NR, no explicit HARQ feedback is provided for uplink (UL) transmissions. For downlink (DL) transmissions the wireless communication device feeds back the decoding result for each received DL transport block as ACK (positive acknowledgment) or NACK (negative acknowledgement) to the base station, thereby signalling either success or failure of the downlink transport block decoding at the wireless communication device.

In the absence of HARQ feedback for a transport block transmitted by the base station, i.e. if the base station receives neither an ACK nor a NACK for a transmitted transport block, the base station concludes that the wireless communication device did not receive the downlink transmission. This is referred to as HARQ discontinuous transmission (DTX).

The predominant duplex scheme in NR is time division duplex (TDD). In most of TDD configurations in NR, a single UL time slot can carry the DL HARQ feedback for transmission in a plurality of DL time slots and the wireless communication device multiplexes the HARQ feedback of the plurality of DL time slots in the single UL time slot.

A drawback with the multiplexed HARQ feedback in the UL time slot is that if a transport block of one slot is not received (DTX) while a transport block of a subsequent slot indeed is received but not successfully decoded (NACK), the multiplexed UL HARQ feedback for the two DL slots will be a NACK. This creates ambiguity at the radio base station since the radio base station cannot conclude whether or not the reported NACK correctly pertains to a NACK or rather indicates DTX.

SUMMARY

One objective is to solve, or at least mitigate, this problem in the art and thus to provide an improved method of interpreting multiplexed HARQ feedback data.

This objective is attained in a first aspect by a method of a radio base station of interpreting multiplexed HARQ feedback data received from a wireless communication device in response to a downlink transmission to the wireless communication device. The method comprises receiving, in response to a downlink transmission, a multiplexed HARQ feedback data set from the wireless communication device and acquiring information indicating each possible combination of reception status of Downlink Control Information (DCI) and decoding status for associated Physical Downlink Shared Channel (PDSCH) data received at the wireless communication device for the number of DCIs being included with the downlink transmission, the information further indicating a multiplexed HARQ feedback data set transmitted by the wireless communication device for each of the combinations and whether or not there is ambiguity as to if one or more NACKs of a multiplexed HARQ feedback data set associated with each of the combinations is a result of failed decoding of PDSCH data or of non-reception of one or more DCIs utilized to schedule the PDSCH data at the wireless communication device. The method further comprises determining if the received multiplexed HARQ feedback data set includes one or more NACKs indicated to be ambiguous, and if so computing, for each received NACK determined to indicate ambiguity, a weight indicating probability that the NACK is a result of failed decoding of PDSCH data, based on the acquired information.

This objective is attained in a second aspect by a radio base station configured to interpret multiplexed HARQ feedback data received from a wireless communication device in response to a downlink transmission to the wireless communication device. The radio base station comprises a processing unit and a memory, said memory containing instructions executable by said processing unit, whereby the radio base station is operative to receive, in response to a downlink transmission, a multiplexed HARQ feedback data set from the wireless communication device and to acquire information indicating each possible combination of reception status of DCI and decoding status for associated PDSCH data received at the wireless communication device for the number of DCIs being included with the downlink transmission, the information further indicating a multiplexed HARQ feedback data set transmitted by the wireless communication device for each of the combinations and whether or not there is ambiguity as to if one or more NACKs of a multiplexed HARQ feedback data set associated with each of the combinations is a result of failed decoding of PDSCH data or of non-reception of one or more DCIs utilized to schedule the PDSCH data at the wireless communication device. The radio base station is further operative to determine if the received multiplexed HARQ feedback data set includes one or more NACKs indicated to be ambiguous, and if so to compute, for each received NACK determined to indicate ambiguity, a weight indicating probability that the NACK is a result of failed decoding of PDSCH data, based on the acquired information.

Advantageously, the radio base station determines for a DL transmission comprising a given number of DCIs each possible combination of reception status of DCI and decoding status for associated PDSCH data received at the wireless communication device and further each multiplexed HARQ feedback data set that the wireless communication device in response thereto.

By further determining under which circumstances a NACK of a received multiplexed HARQ feedback data set would be ambiguous, i.e. if there is ambiguity as to if one or more NACKs of a multiplexed HARQ feedback data set associated with each of the combinations is a result of failed decoding of PDSCH data or of non-reception of one or more DCIs utilized to schedule the PDSCH data at the wireless communication device, it is possible to identify such ambiguous NACKs and compute a weight indicating the probability that the NACK indeed is a true NACK, i.e. the result of unsuccessful decoding of PDSCH data, and not a DCI which has been missed by the wireless communication device. The radio base station may thus advantageously conclude with a certain probability that the NACK is a true NACK (or conversely that the NACK rather indicates DTX).

In an embodiment, the computing of the weight comprises identifying, from the acquired information, all multiplexed HARQ feedback data sets indicated to comprise one or more ambiguous NACKs, grouping all identical multiplexed HARQ feedback data sets indicated to comprise one or more ambiguous NACKs in the same group and computing the weight by determining, from the acquired information, a proportion of NACKs being the result of failed decoding at the wireless communication device for each ambiguous NACK in a grouped multiplexed HARQ feedback data set corresponding to the HARQ feedback data set received from the wireless communication device.

In an embodiment, the computing of the weight by determining a proportion of NACKs being the result of failed decoding at the wireless communication device comprises dividing, for each ambiguous NACK entry in the grouped multiplexed HARQ feedback data set, number of NACKs for the grouped multiplexed HARQ feedback data sets by total number of NACKs being result of failed decoding of the PDSCH data and of non-reception of the one or more DCIs utilized to schedule the PDSCH data at the wireless communication device for the grouped multiplexed HARQ feedback sets.

In an embodiment, separate groupings are performed depending on whether HARQ feedback data sets are transported via Physical Uplink Shared Channel (PUSCH) or via Physical Uplink Control Channel (PUCCH).

In an embodiment possible HARQ feedback data sets further being a result of decoding errors at the radio base station are identified and grouped with said identical multiplexed HARQ feedback data sets.

In an embodiment, the determining if the received multiplexed HARQ feedback data set includes one or more NACKs indicated to be ambiguous comprises determining that the multiplexed HARQ feedback data set is received via PUCCH, determining PUCCH format being used for the received HARQ feedback data set and if the PUCCH format is either 0 or 1, determining that a number of DCIs utilized to schedule the PDSCH data being included in the downlink transmission is greater than one, determining that a last number of the DCIs utilized to schedule the PDSCH data comprised in the downlink transmission, the number equaling the number of DCIs utilized to schedule the PDSCH data being transmitted minus 2, is not received at the wireless communication device, determining that if only a single bit is received in the HARQ feedback data set, a first DCI utilized to schedule the PDSCH data in the downlink transmission is not ambiguous while the a second DCI utilized to schedule the PDSCH data is not received at the wireless communication device, and determining that if a NACK is received followed by an ACK indicating successful decoding of a DCI utilized to schedule the PDSCH data, the NACK is ambiguous, while if an ACK is followed by a NACK, both are received at the wireless communication device and the NACK is not ambiguous.

In an embodiment, if the PUCCH format is determined to be either 2, 3 or 4, the method comprises determining that if a number of bits included in the HARQ feedback data set equals the number of DCIs utilized to schedule the PDSCH data in the downlink transmission, the last DCI utilized to schedule the PDSCH data is not ambiguous but any NACK for the remaining DCIs utilized to schedule the PDSCH data is ambiguous and determining that if the number of bits included in the HARQ feedback data set is less than the number DCIs utilized to schedule the PDSCH data in the downlink transmission: a last number of the DCIs utilized to schedule the PDSCH data comprised in the downlink transmissions, the number equaling the number of DCIs utilized to schedule the PDSCH data being transmitted minus the number of bits included in the HARQ feedback data set, is not received at the wireless communication device, the DCI utilized to schedule the PDSCH data at a position corresponding to the number bits included in the HARQ feedback data is not ambiguous, and all NACKS are ambiguous for the remaining DCIs utilized to schedule the PDSCH data.

In an embodiment, the determining if the received multiplexed HARQ feedback data set includes one or more NACKs indicated to be ambiguous comprises determining that the multiplexed HARQ feedback data set is received via the PUSCH, determining that if a number of DCIs utilized to schedule the PDSCH data being included in the downlink transmitted is less than five, all NACKs are ambiguous, determining that if a number of DCIs utilized to schedule the PDSCH data being included in the downlink transmitted is five or more and a cyclic redundant check on the PUSCH is successful, all but one NACK are ambiguous in case only NACKs are received and if not all NACKs are ambiguous.

In an embodiment, the reception status of a DCI indicates whether the DCI was received or not and the decoding status for the associated PDSCH data indicates whether the data was successfully decoded or not.

In an embodiment, said information is acquired by the radio base station itself being configured to derive the information for a particular number of DCIs being included in a downlink transmission.

In an embodiment, said information being acquired from an entity being configured to derive the information for a particular number of DCIs being included in a downlink transmission.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 4 shows a table indicating DCI reception status and PDSCH decoding status of a wireless communication device and corresponding HARQ feedback according to an embodiment;

FIG. 5 shows a table illustrating a subset of the data shown in the table of FIG. 4;

FIG. 7 shows a table illustrating decoding errors performed by a radio base station due to channel imperfections;

FIGS. 8a-b illustrate a framework for determining whether or not a received NACK is ambiguous or not according to an embodiment.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figures 1, 2:
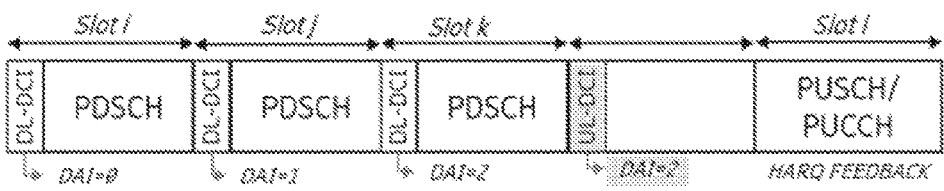
FIG. 1 illustrates the concept of HARQ where a radio base station transmits DL data to a wireless communication device.
FIG. 2 illustrates two examples of transmissions with three time slots each comprising a DCI with associated PDSCH payload data transmitted from a radio base station to a wireless communication device with a multiplexed HARQ feedback data set sent from the wireless communication device to the radio base station in one uplink slot.

FIG. 1 illustrates the concept of HARQ where a device in the form of a radio base station 10 (RBS) transmits DL data to a wireless communication device ii, commonly referred to as a User Equipment (UE). The RBS 10 is in NR commonly referred to as a gNodeB or gNB.

Downlink control information (DCI) is sent to the UE 11 over a Physical Downlink Control Channel (PDCCH) while the associated DL payload data is sent to the UE 11 over a Physical Downlink Shared Channel (PDSCH).

PDSCH transmission is scheduled with a DCI of FORMAT 1_0 or FORMAT 11 (which will be referred to as DL-DCI in the following). The UE should thus receive a DL-DCI over the PDCCH to properly decode the associated PDSCH transmission, Further, Physical Uplink Shared Channel (PUSCH) transmission is scheduled with a DCI of FORMAT 0_1 or FORMAT 0_0 (which will be referred to as UL-DCI in the following). The UE may thus receive a UL-DCI for uplink payload data transmission on Physical Uplink Shared Channel (PUSCH), i.e. the UL-DCI in practice constitutes a UL grant for the UE 11. The reception of a HARQ ACK/NACK at the gNB 10 for DL transmissions implies that the UE 11 has received the corresponding DL-DCI transmitted on the PDCCH.

Hence, the UE 11 decodes the DL data sent by the gNB 10 and feeds back HARQ information indicating whether the decoding of the received DL data was successful or not. As discussed, successful decoding is indicated by the UE 11 transmitting an ACK to the RBS 10 while unsuccessful decoding is indicated by transmitting a NACK. If the UE 11 does not receive the DL-DCI associated with a set of DL data, the UE 11 will not provide any HARQ feedback, which state commonly is referred to as DL-HARQ DTX.

The HARQ feedback is sent from the UE 11 to the gNB 10 either on the PUSCH or on a Physical Uplink Control Channel (PUCCH). If a UL-DCI is sent by the gNB 10 on the PDCCH, the UE 11 sends the HARQ feedback as uplink control information (UCI) on the PUSCH given that the UE 11 successfully receives and decodes the UL-DCI. If not, the UE 11 sends the HARQ feedback on the PUCCH.

As previously discussed, the predominant duplex scheme in NR is TDD, which implies that a single UL time slot can carry the DL HARQ feedback for a plurality of DL time slots and the UE 11 multiplexes the HARQ feedback of the plurality of DL time slots in the single UL time slot.

A drawback with the multiplexed HARQ feedback in the UL time slot is that if a transport block of one slot is not received (denoted DTX) while a transport block of a subsequent slot indeed is received but not successfully decoded (NACK), the multiplexed UL HARQ feedback for the two DL slots will be a NACK. This creates ambiguity at the radio base station, since the radio base station cannot conclude whether or not the reported NACK correctly pertains to a NACK or rather indicates DTX, i.e. that the UE 11 failed to receive the transmitted data.

Embodiments described in the following aim at identifying the ambiguities and determining a probability as to whether a NACK received at the gNB 10 indeed is a NACK or if the received NACK rather should be interpreted as DTX.

FIG. 2 illustrates two examples of transmissions with three time slots i, j, k each comprising a DL-DCI (i.e. a DCI of FORMAT 1_0 or of FORMAT 1_1) with associated PDSCH payload data transmitted from the gNB 10 to the UE 11 with a multiplexed HARQ feedback sent from the UE 11 to the gNB 10 in one uplink slot 1. In other words, the DL-DCI is a DCI utilized to a schedule PDSCH data to a specific UE.

As discussed hereinabove, the HARQ feedback may be sent in the UL either on the PUSCH or the PUCCH; if the UE 11 does not receive a UL-DCI (i.e. a DCI of FORMAT 0_1 or FORMAT 0_0) as in the upper example, the UE 11 transmits the HARQ feedback on the PUCCH while if a UL-DCI is received by the UE 11 as in the lower example, the HARQ feedback is transmitted on the PUSCH. In other words, the UL-DCI is a DCI utilized to grant a specific UE access to PUSCH, i.e. to allow the UE to schedule PUSCH data to the gNB.

With further reference to FIG. 2, NR specifies a parameter referred to as downlink assignment index (DAI) associated with each DCI transmitted to the UE 11 in order to signal the total number of DL-DCIs transmitted to the UE 11. This allows the UE 11 to determine the total number of DL-DCIs transmitted by the gNB 10 even if the UE 11 missed some DL-DCIs that were sent earlier, thereby enabling the UE 11 to use an appropriate codebook size for the multiplexed HARQ feedback that matches the number of the transport blocks transmitted to the UE 11.

In NR, the DAI numbering starts from 0, and utilizes 2 bits to represent the indices 0, 1, 2 and 3. The DAI is attached as a field to both DL-DCIs and UL-DCIs. For instance, if three DL-DCIs without an UL-DCI are transmitted to the UE 11 as in the upper example of FIG. 2, the three DL-DCIs will have DAI values 0, 1 and 2. If an UL-DCI also is transmitted to the UE 11, it will have a DAI value of 2 associated with it.

With the DAI included in the UL-DCI, the UE 11 is made aware that three DL-DCIs were transmitted by the gNB 10 together with the UL-DCI for allowing HARQ feedback transmission on PUSCH.

If more than four DL-DCIs are transmitted to the UE 11, the DAI wraps around and starts from zero again. For example, if six DL-DCIs are transmitted to the UE 11, the DAI values attached to the DL-DCIs will be 0, 1, 2, 3, 0 and 1.

The wrapping around of the DAI may confuse the UE 11 in determining the number of DL-DCIs transmitted by the gNB 10. In the example above with six DL-DCIs, if the UE 11 misses the first four DL-DCIs and receives the last two, the UE 11 will assume that only two DL-DCIs have been transmitted by the gNB 10, thereby transmitting a two-bit HARQ feedback. The DAI wrap-around may create a similar confusion at the gNB 10 since it may not be able to distinguish whether the received two-bit HARQ feedback is for the first two or last two DL-DCIs of the six DL-DCIs transmitted.

For the multiplexed HARQ feedback data set, the UE 11 will signal a NACK bit if it misses the initial DL-DCIs but receives the later ones. This causes an ambiguity for the gNB 10 to differentiate between HARQ-DTX and HARQ-NACK as the gNB 10 cannot ensure whether such a NACK corresponds to a real NACK where a cyclic redundant check performed on the PDSCH transport block fails or if the UE 11 simply has missed the DL-DCIs and thus signalled a NACK bit, i.e. a DTX "disguised" as NACK. Such ambiguities are quite common in NR and may have serious consequences for general network performance.

In an example, one feature being heavily affected by the HARQ-DTX/HARQ-NACK ambiguity is outer loop adjustment for link adaptation of the PDCCH. The PDCCH link adaptation (LA) adjusts Control Channel Element (CCE) aggregation levels (AL) used to transmit DCIs according to estimated PDCCH signal-to-interference-plus-noise ratio (SINR) in order to optimize CCE usage while maintaining a robust PDCCH link to the UE. The outer loop adjustment (OLA) part of PDCCH LA uses the HARQ feedback for DL transmissions as an input in order to update an SINR adjustment term to the link adaptation. Normally a HARQ ACK is considered as the DL-DCI is properly received and hence result in a positive SINR adjustment while a HARQ DTX is considered as the DL DCI is missed and results in a negative SINR adjustment for the PDCCH LA. If there is no ambiguity (e.g. in case of DL transmission of a single DL-DCI to a UE), a HARQ NACK at the gNB 10 is also considered to indicate that the DL-DCI is properly received at the UE 11. However, with the ambiguities in the HARQ-NACKs of the multiplexed HARQ feedback data set from the UE, such a simple relation cannot be established based on the HARQ-NACK. The PDCCH channel has a very high robustness requirement and usually operates on a very small target error rate, typically 1%. Actual HARQ DTX that comes disguised as NACK will deteriorate the PDCCH error performance which in turn leads to significant drop in UE retainability as the PDCCH LA is not able to make the proper adjustments in the CCE AL that is needed.

Other critical features of the gNB 10 that may be heavily affected by the DTX-NACK ambiguity are the implementation of the HARQ retransmission protocol itself and the transport format selection for PDSCH retransmissions in the scheduler. The redundancy version (RV) selection and transport format selection for retransmissions make distinctions for initial transmissions whose feedback is either NACK or DTX. An ambiguous DTX that comes disguised as NACK will use the RV for a NACK together with a retransmission modulation and coding scheme (MCS). A UE that did not receive the previous DL-DCI transmitted to it (DTX) will not be able to decode a transport block on a retransmission redundancy version and MCS leading to a significant increase in the block error rate (BLER) of the PDSCH. The residual BLER for all HARQ transmissions will also increase significantly. The residual BLER is the BLER estimated by considering all HARQ retransmissions. This ultimately leads to HARQ failure as the UE will not be able to decode such retransmissions and the HARQ failures force retransmissions at RLC level and degrade network performance critically.

Figure 3:
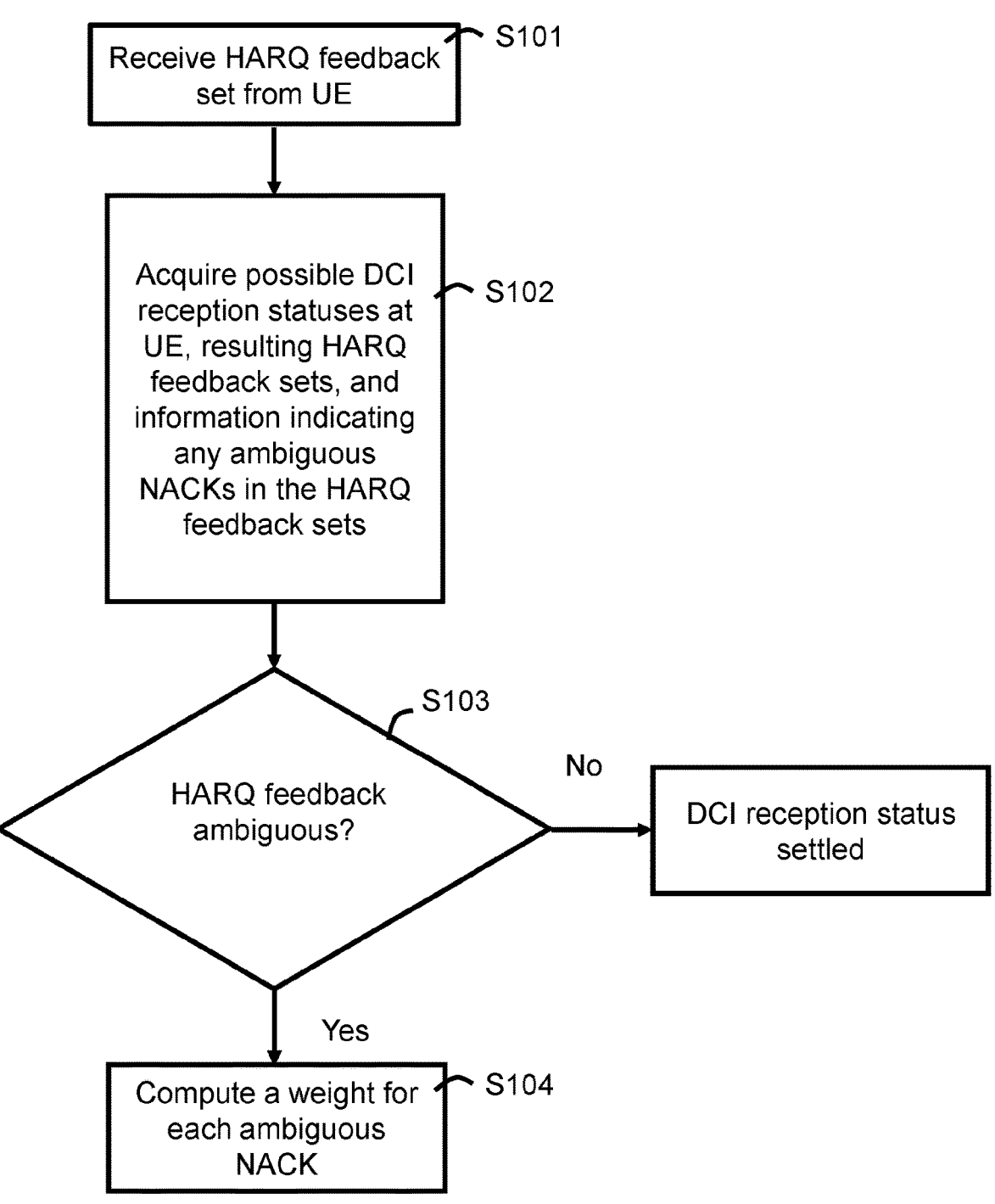
FIG. 3 shows a flowchart illustrating a method of a radio base station of detecting multiplexed HARQ feedback data sets received from a wireless communication device in response to a downlink transmission.

FIG. 3 shows a flowchart illustrating a method of an RBS, such as the gNB 10, of detecting multiplexed HARQ feedback data received from a wireless communication device, such as the UE 11, in response to a downlink transmission to the UE 11.

In a first step S101, the gNB 10 receives a multiplexed HARQ feedback data set from the UE 11 in response to DL data sent from the gNB 10 to the UE 11.

The gNB 10 will in step S102 (which may be performed before receiving the multiplexed HARQ feedback set in step S101) acquire information indicating each possible combination of reception status of DCI sets ("DCIs") and decoding status for associated PDSCH data received at the UE 11 for the number of DCIs being included with the downlink transmission. The reception status and decoding status will be discussed and exemplified in detail hereinbelow with reference to columns 1-3 in Table 2 of FIG. 4 where an exemplifying embodiment illustrating transmission of three DL-DCIs is shown, which DL transmission further may or may not include a UL-DCI. It is noted that the more DCIs being transmitted in the DL, the more combinations are possible. FIG. 4 shows the possible combination with three DL-DCIs being transmitted.

The acquired information further indicates the multiplexed HARQ feedback data set of the UE 11 for each of the combinations and whether or not there is ambiguity as to if one or more NACKs of a multiplexed HARQ feedback data set associated with each of the combinations is a result of failed decoding of one or more DCIs or of non-reception of the one or more DCIs at the UE 11. The multiplexed HARQ feedback data set of the UE 11 for each of the combinations will be discussed and exemplified in detail hereinbelow with reference to column 5 in Table 2 of FIG. 4 while the ambiguous NACKs (referred to as "gNB decisions") will be discussed and exemplified with reference to column 6 in Table 2, where HARQ ambiguity decisions of the gNB 10 for the corresponding multiplexed HARQ feedback data sets are listed.

The gNB 10 determines in step S103 if the multiplexed HARQ feedback data set received in step S101 includes one or more NACKs indicating ambiguity. A framework for determining whether or not a received NACK is ambiguous or not will be discussed and exemplified in detail with reference to FIGS. 8*a-b*.

If so, the gNB 10 computes in step S104—for each received NACK determined to indicate ambiguity—a weight indicating probability that the NACK is a result of failed decoding of one or more DCIs, based on the acquired information (i.e. the information set out in Table 2 of FIG. 4).

As described hereinabove, in NR TDD, the UE 11 multiplexes the HARQ feedback data corresponding to multiple DL transmissions on PDSCH with their associated multiple DL-DCIs on PDCCH in a single multiplexed HARQ feedback data set. The multiplexed HARQ feedback data set may be transmitted to the gNB 10 either on the PUSCH (as payload data) or on the PUCCH (as control data) depending on whether or not a UL-DCI is received with the DL data received at the UE 11. As will be discussed and exemplified in detail in the following, this affects the decision of the gNB 10 as to whether a NACK is detected as ambiguous or not, i.e. whether a received NACK is a true NACK or a NACK disguised as DTX.

With reference to Table 1 below, among the supported PUCCH formats in NR, PUCCH FORMAT 0 and 1 can carry up to two HARQ feedback bits. If more than two HARQ feedback bits are to be signalled, PUCCH FORMAT 2, 3 or 4 can be used. It is the responsibility of the gNB 10 to configure the UE 11 with the appropriate PUCCH resources to transmit the HARQ feedback, where each PUCCH resource corresponds to a PUCCH format. Table 1 summarizes the NR PUCCH formats and the number of HARQ feedback bits that can be multiplexed in each format.

TABLE 1

Different PUCCH formats

| PUCCH Format | Number of HARQ bits |
|---|---|
| 0 | <=2 |
| 1 | <=2 |
| 2 | >2 |
| 3 | >2 |
| 4 | >2 |

The UCI on PUSCH can carry from one up to the maximum number of HARQ feedback bits supported for the TDD configuration. As will be shown, the configured PUCCH format will also affect the decision of the gNB 10 as to whether a NACK is detected as ambiguous or not.

Table 2 in FIG. 4 enumerates in column 5 all possible multiplexed HARQ feedback data set combinations that can be transmitted by the UE 11 to the gNB 10 in a scenario where three DL-DCIs are transmitted by the gNB 10 to the UE 11 as discussed with reference to FIG. 2. It is understood that the methodology outlined by the embodiments disclosed herein can be applied to any number of DL-DCIs being transmitted. Further as will be discussed and exemplified, the data of Table 2 may be acquired by the gNB 10 either by the gNB 10 itself deriving the data or by the gNB 10 acquiring the data from any other appropriate entity.

Firstly, the reception status of each DL-DCI and the decoding status of the associated PDSCH data at the UE 11 is enumerated and shown in the first three columns with the DAI at each column indicating the particular DL-DCI being received by the UE 11.

The table is divided into three sub-tables denoted 1, 2 and 3, where:

the first sub-table 1 shows the case where the 3rd DL-DCI (i.e. corresponding to DAI=2) is received by the UE 11, the second sub-table 2 shows the case where the 3rd DL-DCI is missed, and the UE 11 is not able to detect it, and the third sub-table 3 shows the case where an UL-DCI is received by the UE 11, as indicated by UL-DCI status in the fourth column, thereby enabling HARQ feedback on PUSCH.

An "R" indicates that the DCI is received, while "X" indicates that the DCI is not received. An "OK" indicates that the PDSCH CRC is correct resulting in successful decoding while "NOK" conversely indicates that the UE fails to decode the PDSCH. The symbol "R/X" for the DL-DCI reception indicates two different cases, namely that the DL-DCI may have been received (NACK) or not (DTX). Note that for both cases the corresponding DL-HARQ feedback is NACK, hence leading to the NACK-DTX ambiguity.

Secondly, the multiplexed HARQ feedback data sets that would be received at the gNB 10 as a result of the corresponding UE DCI reception and PDSCH decoding statuses of columns 1-3 are enumerated and shown in the 5$^{th}$ column.

In other words, given that three DL-DCIs are included in the downlink transmission, columns 1-3 list all possible combinations of DCI reception and PDSCH decoding status at the UE 11 while column 5 lists the multiplexed HARQ feedback data sets that would be received at the gNB 10 for each combination.

Thirdly, the 6$^{th}$ column shows the decisions of the gNB 10 as to whether there is ambiguity or not in the potentially received multiplexed HARQ feedback data sets of the 5$^{th}$ column, i.e. if the gNB 10 considers the respective HARQ feedback bit as received ("REC") to reflect reception of the DL-DCI at the UE 11, or if a DTX can be clearly inferred for missed DL-DCIs at the UE 11, or ambiguous ("AM") if neither reception nor a DTX can be inferred.

The DAI plays a major role in the determination at the UE 11 of how many DL-DCIs were transmitted by the gNB 10:

if the gNB 10 transmits three DL-DCIs and the UE 11 detects the 3rd DAI (DAI=2), the UE 11 assumes that three DL-DCIs were transmitted and the PUCCH resource should be of format 2, 3 or 4 (sub-table 1), and if the 3rd DL-DCI is not detected but at least one of the first DCIs is detected, the UE uses its configured PUCCH resource format 0 or 1 to transmit its multiplexed HARQ feedback data set for the detected DCIs (sub-table 2). The gNB 10 thus needs to evaluate which PUCCH format is used by the UE 11. If PUCCH format 0 or 1 is detected, the gNB 10 decides that the 3rd DL-DCI is lost without any ambiguity.

The case where an UL-DCI is also received by the UE 11 is shown in sub-table 3. When an UL-DCI is received by the UE 11, the multiplexed HARQ feedback data set is transmitted as UCI on the PUSCH channel. The UL-DCI will have the maximum DAI value of the last transmitted DL-DCI attached to it. This leads to more ambiguities compared to the case where the multiplexed HARQ feedback data set is received on the PUCCH channel.

For example, consider the case where three DL-DCIs are transmitted to the UE 11 (and the UE did not receive an UL-DCI) and the last two are missed. The gNB 10 will straightforwardly establish that two of the DL-DCIs are missed and one is received since only one HARQ feedback bit will be received on the PUCCH. With reference to Table 2 of FIG. 4, the 4$^{th}$ column illustrates for sub-tables 1 and 2 that the UE 11 did not receive an UL-DCI (even though the gNB 10 indeed may have transmitted one) whereas for sub-table 3, a UL-DCI has been received at the UE 11.

However, if an UL-DCI is also transmitted to the UE 11, a DAI value of 2 will be attached to the UL-DCI and the UE will transmit a multiplexed HARQ feedback data set of [ACK NACK NACK] creating an ambiguity for the first two DL-DCIs.

Note that if all DL-DCIs are missed at the UE 11 and no UL-DCI is received at the UE 11, the gNB 10 will not receive any HARQ feedback bits and consequently conclude that all DL-DCIs were lost.

As can be seen in Table 2, if a DL-DCI is not received but the later DL-DCIs are received or the DL-DCI is detected but the PDSCH CRC is not OK, the UE 11 reports the HARQ feedback corresponding to that transmission as NACK.

As can be concluded from Table 2, a number of parameters are key for determining whether HARQ feedback bits received by the gNB 10 are ambiguous or not (as shown in column 6):

a) is a multiplexed HARQ feedback data set received on PUCCH or PUSCH (where PUSCH is utilized if the UE 11 detects an UL-DCI in the downlink transmission)?

b) with which format is a multiplexed HARQ feedback data set sent by the UE 11 over PUCCH?

c) how many DL-DCIs were transmitted?

Thus, in an embodiment, in order to identify ambiguities associated with DL-DCI reception (cf. step S103) in multiplexed HARQ feedback data sets received from the UE 11 (cf. step S101) for a given number of DL-DCIs transmitted by the gNB 10, the gNB 10 acquires information (cf. step S102) which enumerates or lists all possible combinations of DL-DCI reception statuses and PDSCH decoding statuses at the UE 11, the corresponding multiplexed HARQ feedback data sets that would be received at the gNB 10 and information indicating any DL-DCI reception ambiguities.

It is noted that the gNB 10 may acquire the information by itself determining all possible combinations of DL-DCI reception statuses and PDSCH decoding statuses at the UE 11 given the number of DL-DCIs included in the downlink transmission, as well as the corresponding multiplexed HARQ feedback data sets received at the gNB 10 and information indicating any HARQ ambiguities.

However, it may alternatively be envisaged that the information is received from any other appropriate entity to which the gNB 10 is connected, for instance a NR core network entity such as an Access & Mobility management Function (AMF) or any other appropriate 5G core Network Function (NF), or even an external network server or cloud structure to which the gNB 10 is connected via a core network User Plane Function (UPF).

With reference to Table 3 of FIG. 5, a selected number of examples from Table 2 are included and will be discussed and exemplified in more detail regarding the determination of ambiguous NACKs.

Example 1

In the first row of Table 3, the UE 11 has missed the DL-DCIs corresponding to the first two transmissions (i.e. DAI=0 and DAI=1), but has received the third transmission and its associated DL-DCI (DAI=2) which has a DAI value of 2. Since the last DL-DCI indeed was received, the UE will signal [NACK NACK ACK] as multiplexed HARQ feedback data set, both of which NACKs thus are ambiguous resulting in [AM AM REC] in the $6^{th}$ column.

Example 2

In the second row of Table 3, the UE 11 has received all three DL-DCIs. The CRC check on the first two PDSCH transmissions was NOK but OK for the third PDSCH transmission. The gNB 10 will not be able to determine whether the NACKs are a result of a NOK for the first two DL-DCIs or if these two are missed given that the UE 11 nevertheless will signal NACKs since the last DL-DCI is an ACK. Again, the UE will signal [NACK NACK ACK] as multiplexed HARQ feedback data set, which NACKs thus are ambiguous, resulting in [AM AM REC] in the $6^{th}$ column. As a result, the multiplexed HARQ feedback data sets for the first and second row of Table 3 are effectively the same, as are the ambiguity determination for the two.

Example 3

In the third row of Table 3, the UE 11 has missed the second DL-DCI, but has received the first and third DL-DCIs. The CRC check on the first PDSCH transmission is OK but NOK for the third one. Again, since the last DL-DCI indeed was received and thus is a true NACK, the gNB 10 will not be able to determine whether the first NACK (DAI=1) is a true NACK or DTX. The UE will signal [ACK NACK NACK] as multiplexed HARQ feedback data set, where the $1^{st}$ of the two NACKs is ambiguous, resulting in [REC AM REC] in the $6^{th}$ column.

Example 4

In the fourth row of Table 3, the UE has received the first two DL-DCIs but has missed the third DL-DCI. The DAI value for the second DCI is 1. The CRC check on the first PDSCH transmission is OK but NOK for the second one. Since the UE missed the last DL-DCI, it will only signal two HARQ feedback bits [ACK NACK] in the multiplexed HARQ feedback data set where none is ambiguous and the gNB 10 can conclude that the third DL-DCI is DTX, resulting in [REC REC DTX] in the $6^{th}$ column. Hence, there are no ambiguities in this example.

Example 5

The fifth row of Table 3 is the same as the fourth row except that the UE 11 has also received an UL-DCI. The UL-DCI will have a DAI value of 2 attached to it indicating to the UE that three DL-DCIs were transmitted to it. The multiplexed HARQ feedback data set will be transmitted on PUSCH and thus use three bits. The UE will signal [ACK NACK NACK] as multiplexed HARQ feedback data set, where both NACKs is ambiguous even though the last DL-DCI was not received, resulting in [REC AM AM] in the $6^{th}$ column.

As previously discussed with reference to step S104 of FIG. 3, for any received multiplexed HARQ feedback data set (column 5) identified as comprising one or more NACKs considered to be ambiguous (column 6), the gNB 10 will compute a weight indicating the probability that an ambiguous NACK is a real NACK, i.e. the NACK is a result of a DL-DCI being received but the CRC check on the PDSCH transmission failed. As discussed, real NACKs are denoted NOK in the right-hand sub-column "PDSCH-CRC" of columns 1-3 in Tables 2 and 3).

As is understood, the computation is not necessarily performed by the gNB 10 itself, but may be performed by any other appropriate entity or device to which the gNB 10 is connected, for instance the previously mentioned AMF, NF, or external network server or cloud structure to which the gNB 10 is connected via a UPF, or by a plurality of these entities interoperating to perform the computation.

Figure 6:
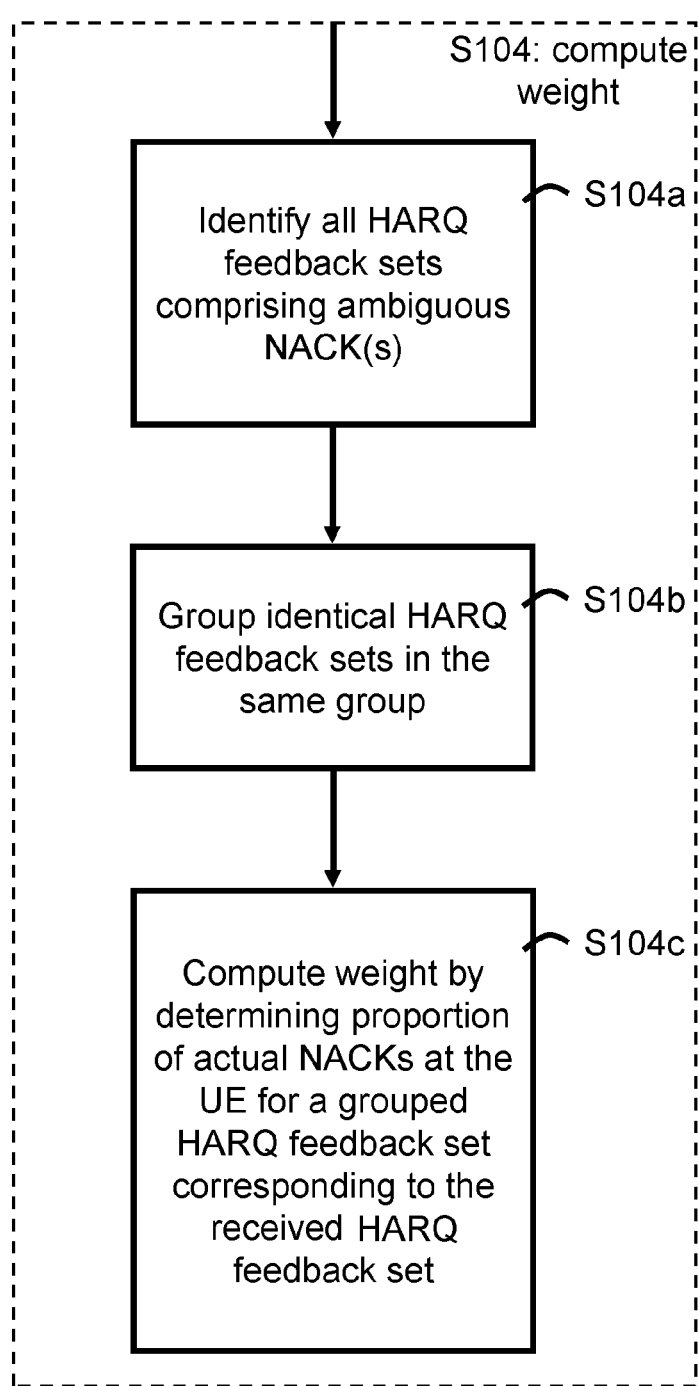
FIG. 6 shows a flowchart illustrating computation of weights for ambiguous NACKS according to an embodiment.

FIG. 6 shows a flowchart illustrating computation of weights for ambiguous NACKS according to an embodiment.

Firstly, in step S104*a*, all multiplexed HARQ feedback data sets in column 5 of Table 2 comprising one or more ambiguous NACKs are identified, thereby resulting in the decisions of the gNB 10 in column 6. In other words, the gNB 10 determines if the multiplexed HARQ feedback set indicates whether or not there is ambiguity as to if one or more NACKs of a multiplexed HARQ feedback data set is a result of failed decoding of PDSCH data or of non-reception of one or more DL-DCIs utilized to schedule the PDSCH data at the UE 11.

Secondly, in step S104*b*, the decisions of the gNB 10 of column 6 in Table 2 are grouped such that all identical decisions are categorized into the same group.

It is noted that a separate grouping and subsequent weight computation is performed depending on whether the multiplexed HARQ feedback data sets are transmitted via PUSCH or PUCCH.

In other words, when performing the weight computation, all identical sets of column 6 are categorized into the same group for PUSCH and PUCCH, respectively. For instance, with reference to column 6 of Table 2, the different groups will consist of [REC AM REC], [AM REC REC], [AM AM REC] and [AM REC DTX] on PUCCH and [REC REC AM], [REC AM REC], [REC AM AM], [AM REC REC], [AM REC AM], [AM AM REC] and [AM AM AM] on PUSCH.

Thirdly, in step S104*c*, the gNB 10 computes a weight for any ambiguous NACKs of the gNB decisions of column 6 in Table 2.

Thus, for any multiplexed HARQ feedback data set received in step S101 of FIG. 3, which received multiplexed HARQ feedback data set is considered to comprise one or more ambiguous NACKs in step S103, a weight is computed in step S104 based on the acquired information of step S102, i.e. the information held in Table 2 of FIG. 5.

It should be noted that for each combination in Table 2, a weight may already have been computed in advance. For instance, assuming that the gNB 10 receives a multiplexed HARQ feedback data set [ACK NACK ACK] in step S101 which is determined to be ambiguous and have the appearance [REC AM REC] in step S103, a weight may already have been computed for the ambiguous NACK at the position corresponding to DAI=1, which weight would be included in the information acquired in step S102 (i.e. Table 2). If so, the gNB 10 will assign that already computed weight to the received ambiguous NACK in the received multiplexed HARQ feedback data set [ACK NACK ACK].

In an embodiment, the computation of the step S104*c* is performed by determining a proportion of actual NACKs, i.e. NACKs being the result of unsuccessful decoding, at the UE 11 for each ambiguous NACK in the decisions of the gNB 10 of column 6. For each index of an ambiguous (AM) gNB decision, the number of NACKs in the multiplexed HARQ feedback data set of column 5 is divided by the total number of NACKs and DTXs for the corresponding entries (i.e. columns 1-3) received at the UE 11. The weight of a non-ambiguous NACK is considered to be 1.

For instance, considering the decision [AM REC DTX] of the gNB 10 of rows 4 and 5 of sub-table 2 in Table 2. In this particular exemplifying embodiment, with reference to Table 4 of FIG. 7, it will also be assumed that the gNB 10 performs decoding errors due to channel imperfections. As illustrated in the highlighted column 3 of Table 4, the UE 11 has actually received the third DL-DCI and would thus transmit three HARQ feedback bits. However, the gNB 10 decodes a 2-bit feedback on PUCCH format 1 due to channel imperfections and determines that the $3^{rd}$ DL-DCI is DTX.

The weight for the ambiguous NACK in [AM REC DTX] will be computed by summing the total number of NACKs in the multiplexed HARQ feedback data set of column 5 for the ambiguous entry of [AM REC DTX] in column 6, which amounts to 4 (one each in row 4 and 5 of sub-table 2 in Table 2 for the position corresponding to DAI=0 and the same for Table 4).

Thereafter, the number of actual NACKs (i.e. a DL-DCI was received but not successfully decoded) at the UE 11 are summed, which amounts to 4 (one each in row 4 and 5 of sub-table 2 in Table 2 for the position corresponding to DAI=0 and the same for Table 4).

Further, the number of DTXs are summed, which amounts to 2 (two Xs in column 1, rows 4 and 5 of sub-table 2 of Table 2).

The weight will thus be computed as, for each ambiguous NACK:

$$\frac{\text{total number of } \textit{NACKs} \text{ in the multiplexed } \textit{HARQ}}{\text{total number of } \textit{NACKs} \text{ and } \textit{DTXs}} = \frac{4}{4+2} = \frac{2}{3}$$
$$\text{at the } \textit{UE} \text{ for the ambiguous entry}$$

Thus, the computed weight indicates that there is a 67% probability that the ambiguous NACK in [AM REC DTX] indeed was the result of unsuccessful decoding of PDSCH data at the UE 11, and thus that there is only a 33% probability that the ambiguous NACK is a DTX at the UE 11. The gNB 10 will hence detect the ambiguous NACK as NACK.

In more complex implementations, the computed weight associated with the ambiguous NACKs can be used to determine the successful/unsuccessful reception of the DL-DCI transmitted to the UE 11. For instance, by performing a Bernoulli trial using the weight associated with the ambiguous NACK, the successful/unsuccessful reception of the DL-DCI can be estimated. Bernoulli random variable or Bernoulli trial is a discrete random variable with two outcomes—success and failure with some given probability of success. Bernoulli trial with a given success probability can be simulated by taking a generated continuous uniform random variable in the interval between 0 and 1, establishing the DL-DCI reception as successful if the generated random variable is less than the given probability and unsuccessful otherwise.

As is understood, the data of Table 2 as well as the weight associated with each decision of the gNB 10 of column 6 in Table 2 may be computed in advance and stored at the gNB 10 or any other appropriate entity from which the gNB 10 can acquire a decision and the associated weight.

The above-discussed weighting computation takes into account decoding errors at the gNB 10 due to channel imperfections. However, in another exemplifying embodiment (not being illustrated in a table) where five DL-DCIs are included in the downlink transmission, a scenario where a grouped decision of the gNB 10 would be [AM AM AM REC REC] for a PUCCH transmission of format 3 is envisaged.

In such a scenario, 14 multiplexed HARQ feedback data sets would be grouped into the single decision consisting of [AM AM AM REC REC].

The total number of NACKs in the multiplexed HARQ feedback data sets for each of the three ambiguous NACKs would amount to 8.

Further, the total number of NACKs and DTXs at the UE 11 for the respective AM entry of the decision of the gNB 10 would be 7+7=14.

The computed weight would thus be $8/14=0.57$. In other words, if the gNB 10 for a downlink transmission comprising five DL-DCIs receives a multiplexed HARQ feedback data set over PUCCH format 3 determined to be ambiguous and have the appearance of [AM AM AM REC REC], the probability that the ambiguous NACKs indeed are real NACKs is 57% (not taking into account any decoding errors at the gNB 10).

Now, when the gNB 10 receives a multiplexed HARQ feedback data set from the UE 11 in step S101, the gNB 10 needs to determine in step S103 if the received multiplexed HARQ feedback data set comprises any NACK(s) indicating ambiguity such that a weight may be computed in step S104 and associated with such NACK(s), based on the information acquired in step S102.

Figure 8B:
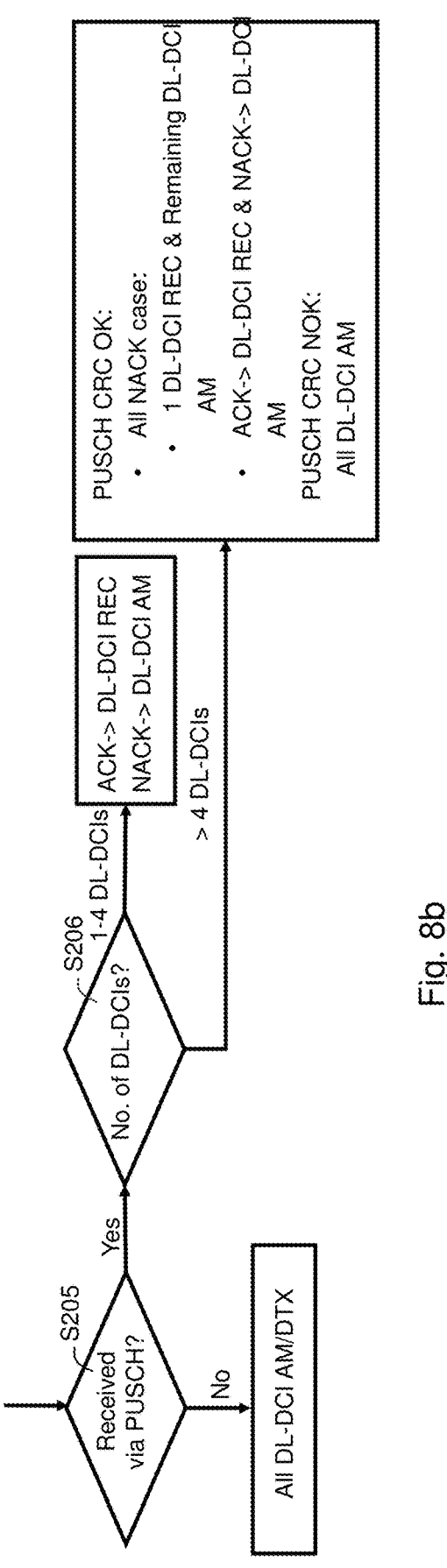

In order for the gNB 10 to be able to determine if any ambiguous NACK is included in a received multiplexed HARQ data set, a number of conditions must be complied with as will be discussed and exemplified in the following with reference to flowcharts of FIGS. 8*a-b* illustrating a framework for determining ambiguity in the received multiplexed HARQ feedback data sets according to embodiments.

In a first step S201 of FIG. 8*a*, the gNB 10 receives a multiplexed HARQ feedback data set from the UE 10 and proceeds to determining whether the feedback is received over PUCCH or PUSCH in step S202. In this example, it is assumed that the feedback is received on PUCCH, which would be the case if no UL-DCI is included in the downlink transmission, or if a UL-DCI indeed was included but the UE 11 missed it.

The gNB 10 then proceeds to determine in step S203 with which format the multiplexed HARQ data set was sent by the UE 11 over PUCCH. The PUCCH formats have been discussed hereinabove with reference to Table 1. If either of PUCCH format 0 or 1 is used, a maximum of 2 bits may be used for the multiplexed HARQ feedback data set, which are the first formats discussed after step S203.

If in step S204 the gNB 10 determines that only one DL-DCI was included in the downlink transmission, the issue of ambiguity will not arise and the gNB 10 can be ensured that any received NACK indeed is a real NACK.

If in step S204 the gNB 10 determines that two or more DL-DCI was included in the downlink transmission, the gNB 10 will take the following decisions:

the last [no. of DL-DCIs transmitted—2] DL-DCI(s) are considered missed by the UE 11, denoted DTX.

With reference to sub-table 2 of Table 2 in FIG. 4, as can be seen in the column 3, for a scenario with three-DL-DCIs, the last [3−2=1] DL-DCI associated with DAI=2 is considered missed by the UE 11 resulting in DTX in column 6. Should four DL-DCIs have been transmitted, the last two would be considered missed, and so on, if only a single HARQ bit is received, either an ACK or a NACK, the 1$^{st}$ DL-DCI is considered received while the 2$^{nd}$ DL-DCI is considered missed. With reference to sub-table 2 of Table 2, if either only an ACK or a NACK is received as can be seen in the column 5, the gNB 10 will consider the 1$^{st}$ DL-DCI to be received and the 2$^{nd}$ DL-DCI to be DTX as shown in column 6, and if a NACK is received followed by an ACK, the NACK is deemed ambiguous, while if an ACK is followed by a NACK, both are deemed to be received and thus the NACK is not ambiguous.

If in step S203 the gNB 10 determines that either of PUCCH format 2, 3 or 4 is used, i.e. more than 2 bits may be used for the multiplexed HARQ feedback data set, which further implies that three or more DL-DCIs are included in the downlink transmission, the gNB 10 will take the following decisions.

If the number of bits used for the multiplexed HARQ feedback data set equals the number DL-DCIs transmitted by the gNB 10:

the last DL-DCI is considered to be received and thus non-ambiguous as can be seen in sub-table 1, column 6 of Table 2, and for the remaining DL-DCIs, all NACKS are regarded to be ambiguous.

If the number of bits used for the multiplexed HARQ feedback data set is less than the number DL-DCIs transmitted by the gNB 10:

the last [no. of DL-DCIs transmitted—no. of HARQ feedback bits] DL-DCI(s) are considered to be missed by the UE 11, i.e. DTX. For instance, if four DL-DCIs would have been transmitted while the multiplexed HARQ feedback data set comprised three bits, the 4$^{th}$ DL-DCI would have been considered as DTX, the DL-DCI at the DAI corresponding to the number of HARQ feedback bits in a set is received and thus deemed non-ambiguous (i.e. REC). With the previous example, the 3$^{rd}$ DL-DCI (at DAI=2 corresponding to the 3$^{rd}$ bit since DAI starts at zero) will be considered non-ambiguous, and for the remaining DL-DCIs, all NACKS are deemed to be ambiguous.

With reference to FIG. 8*b*, if in step S202 no HARQ feedback data is received on PUCCH but instead on PUSCH as illustrated in step S205, which means that a UL-DCI was included with the downlink transmission and detected by the UE 11, the gNB 10 determines in step S206 the number of DL-DCIs transmitted.

If the gNB 10 determines in step S206 that less than five DL-DCIs were included in the downlink transmission, the gNB 10 will take the following decisions:

all NACKS are considered ambiguous.

If the gNB 10 determines in step S206 that five or more DL-DCIs were included in the downlink transmission, the gNB 10 needs to check the CRC on the PUSCH due to the previously described wraparound situation occurring when more than four DL-DCIs are transmitted.

In cases where the UE 11 cannot determine the correct number of DCIs transmitted to it due to the DAI wraparound, the UE 11 performs so-called puncturing and inserts an incorrect number of bits in the UCI on PUSCH. As a consequence, the CRC check on the PUSCH fails and the reception status of all transmitted DL-DCIs is identified as ambiguous.

Hence, if more than four DL-DCIs are determined to be transmitted in step S206, the gNB 10 will take the following decisions in case the PUSCH CRC is successful:

if the bits of the received multiplexed HARQ feedback data set are all NACKs:

one DL-DCI is non-ambiguous (REC) while the remaining DCIs are ambiguous (AM); it is noted that gNB 10 cannot distinguish which one of the received NACKs actually is non-ambiguous, else:

any received NACK is ambiguous (while any received ACK can be relied upon similar to all previous scenarios).

To the contrary, if more than four DL-DCIs are determined to be transmitted in step S206 and the PUSCH CRC fails, the gNB 10 cannot make an informed decision, not even for any ACKs received; all received bits are ambiguous.

Thus, upon determining whether or not a NACK is ambiguous or not in step S103 of FIG. 3, the gNB 10 may apply the framework set forth in FIGS. 8a and b. As is understood, the gNB 10 (or any other entity) may further use the framework of FIGS. 8a and b to determine the HARQ ambiguity of column 6 in Table 2 for any number of DCIs being included in a downlink transmission.

In no multiplexed HARQ feedback data set is received, i.e. neither on the PUCCH nor the PUSCH, the gNB 10 will either conclude that all DCIs are DTX or that all DCIs are ambiguous NACKs.

Figure 9:
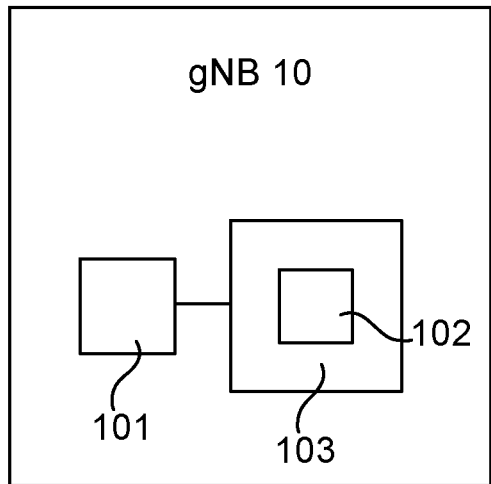
FIG. 9 illustrates a radio base station according to an embodiment.

FIG. 9 illustrates a gNB 10 configured to detect multiplexed HARQ feedback data set received from a UE in response to a downlink transmission to the UE according to an embodiment. The steps of the method performed by the gNB 10 are in practice performed by a processing unit 101 embodied in the form of one or more microprocessors arranged to execute a computer program 102 downloaded to a suitable storage volatile medium 103 associated with the microprocessor, such as a Random Access Memory (RAM), or a non-volatile storage medium such as a Flash memory or a hard disk drive. The processing unit 101 is arranged to cause the gNB 10 to carry out the method according to embodiments described herein, when the appropriate computer program 102 comprising computer-executable instructions is downloaded to the storage medium 103 and executed by the processing unit 101. The storage medium 103 may also be a computer program product comprising the computer program 102. Alternatively, the computer program 102 may be transferred to the storage medium 103 by means of a suitable computer program product, such as a Digital Versatile Disc (DVD) or a memory stick. As a further alternative, the computer program 102 may be downloaded to the storage medium 103 over a network. The processing unit 101 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples thereof. However, as is readily appreciated by a person skilled in the art, other embodiments than the ones disclosed above are equally possible within the scope of the disclosure, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a radio base station of interpreting multiplexed Hybrid Automatic Repeat Request, HARQ, feedback data received from a wireless communication device in response to a downlink transmission to the wireless communication device, comprising:

receiving, in response to a downlink transmission, a multiplexed HARQ feedback data set from the wireless communication device;

acquiring information indicating each possible combination of reception status of Downlink Control Information, DCI, and decoding status for associated Physical Downlink Shared Channel, PDSCH, data received at the wireless communication device for the number of DCIs being included with the downlink transmission, the information further indicating a multiplexed HARQ feedback data set transmitted by the wireless communication device for each of the combinations and whether or not there is ambiguity as to if one or more Negative Acknowledgements, NACKs, of a multiplexed HARQ feedback data set associated with each of the combinations is a result of failed decoding of PDSCH data or of non-reception of one or more DCIs utilized to schedule the PDSCH data at the wireless communication device;

determining whether the received multiplexed HARQ feedback data set includes one or more NACKs indicated to be ambiguous, and in response to determining that the received multiplexed HARQ feedback data set includes one or more NACKs indicated to be ambiguous, computing, for each received NACK determined to indicate ambiguity, a weight indicating probability that the NACK is a result of failed decoding of PDSCH data, based on the acquired information.

2. The method of claim 1, the computing of the weight comprising:

identifying, from the acquired information, all multiplexed HARQ feedback data sets indicated to comprise one or more ambiguous NACKs;

grouping all identical multiplexed HARQ feedback data sets indicated to comprise one or more ambiguous NACKs in the same group; and computing the weight by determining, from the acquired information, a proportion of NACKs being the result of failed decoding at the wireless communication device for each ambiguous NACK in a grouped multiplexed HARQ feedback data set corresponding to the HARQ feedback data set received from the wireless communication device.

3. The method of claim 2, the computing of the weight by determining a proportion of NACKs being the result of failed decoding at the wireless communication device comprising:

dividing, for each ambiguous NACK entry in the grouped multiplexed HARQ feedback data set, number of NACKs for the grouped multiplexed HARQ feedback data sets by total number of NACKs being result of failed decoding of the PDSCH data and of non-reception of the one or more DCIs utilized to schedule the PDSCH data at the wireless communication device for the grouped multiplexed HARQ feedback sets.

4. The method of claim 2, wherein separate groupings are performed depending on whether HARQ feedback data sets are transported via Physical Uplink Shared Channel, PUSCH, or via Physical Uplink Control Channel, PUCCH.

5. The method of claim 2, wherein possible HARQ feedback data sets further being a result of decoding errors at the radio base station are identified and grouped with said identical multiplexed HARQ feedback data sets.

6. The method of claim 1, the determining if the received multiplexed HARQ feedback data set includes one or more NACKs indicated to be ambiguous comprising:

determining that the multiplexed HARQ feedback data set is received via PUCCH;

determining PUCCH format used for the received HARQ feedback data set, and if the PUCCH format is either 0 or 1:

determining that a number of DCIs utilized to schedule the PDSCH data being included in the downlink transmission is greater than one;

determining that a last number of the DCIs utilized to schedule the PDSCH data comprised in the downlink transmission, the number equaling the number of DCIs utilized to schedule the PDSCH data being transmitted minus 2, is not received at the wireless communication device;

determining that if only a single bit is received in the HARQ feedback data set, a first DCI utilized to schedule the PDSCH data in the downlink transmission is not ambiguous while the a second DCI utilized to schedule the PDSCH data is not received at the wireless communication device; and determining that if a NACK is received followed by an Acknowledgement, ACK, indicating successful decoding of a DCI utilized to schedule the PDSCH data, the NACK is ambiguous, while if an ACK is followed by a NACK, both are received at the wireless communication device and the NACK is not ambiguous.

7. The method of claim 6, wherein if the PUCCH format is determined to be either 2, 3 or 4:

determining that if a number of bits included in the HARQ feedback data set equals the number of DCIs utilized to schedule the PDSCH data in the downlink transmission, the last DCI utilized to schedule the PDSCH data is not ambiguous but any NACK for the remaining DCIs utilized to schedule the PDSCH data is ambiguous; and determining that if the number of bits included in the HARQ feedback data set is less than the number DCIs utilized to schedule the PDSCH data in the downlink transmission:

a last number of the DCIs utilized to schedule the PDSCH data comprised in the downlink transmissions, the number equaling the number of DCIs utilized to schedule the PDSCH data being transmitted minus the number of bits included in the HARQ feedback data set, is not received at the wireless communication device;

the DCI utilized to schedule the PDSCH data at a position corresponding to the number bits included in the HARQ feedback data is not ambiguous; and all NACKS are ambiguous for the remaining DCIs utilized to schedule the PDSCH data.

8. The method of claim 1, the determining if the received multiplexed HARQ feedback data set includes one or more NACKs indicated to be ambiguous comprising:

determining that the multiplexed HARQ feedback data set is received via the PUSCH;

determining that if a number of DCIs utilized to schedule the PDSCH data being included in the downlink transmitted is less than five, all NACKs are ambiguous;

determining that if a number of DCIs utilized to schedule the PDSCH data being included in the downlink transmitted is five or more and a cyclic redundant check on the PUSCH is successful, all but one NACK are ambiguous in case only NACKs are received while if both ACKs and NACKs are received, all NACKs are ambiguous.

9. The method of claim 1, wherein the reception status of a DCI indicates whether the DCI was received or not and the decoding status for the associated PDSCH data indicates whether the data was successfully decoded or not.

10. The method of claim 1, said information being acquired by the radio base station itself being configured to derive the information for a particular number of DCIs being included in a downlink transmission.

11. The method of claim 1, said information being acquired from an entity being configured to derive the information for a particular number of DCIs being included in a downlink transmission.

12. A non-transitory computer readable medium comprising computer-executable instructions that, when executed on a processing unit included in a radio base station, cause the radio base station to:

receive, in response to a downlink transmission, a multiplexed Hybrid Automatic Repeat Request, HARQ, feedback data set from the wireless communication device;

acquire information indicating each possible combination of reception status of Downlink Control Information, DCI, and decoding status for associated Physical Downlink Shared Channel, PDSCH, data received at the wireless communication device for the number of DCIs being included with the downlink transmission, the information further indicating a multiplexed HARQ feedback data set transmitted by the wireless communication device for each of the combinations and whether or not there is ambiguity as to if one or more Negative Acknowledgements, NACKs, of a multiplexed HARQ feedback data set associated with each of the combinations is a result of failed decoding of PDSCH data or of non-reception of one or more DCIs utilized to schedule the PDSCH data at the wireless communication device;

determine whether the received multiplexed HARQ feedback data set includes one or more NACKs indicated to be ambiguous, and in response to determining that the received multiplexed HARQ feedback data set includes one or more NACKs indicated to be ambiguous, compute, for each received NACK determined to indicate ambiguity, a weight indicating probability that the NACK is a result of failed decoding of PDSCH data, based on the acquired information.

13. A radio base station configured to interpret multiplexed Hybrid Automatic Repeat Request, HARQ, feedback data received from a wireless communication device in response to a downlink transmission to the wireless communication device, the radio base station comprising a processing unit and a memory, said memory containing instructions executable by said processing unit, whereby the radio base station is operative to:

receive, in response to a downlink transmission, a multiplexed HARQ feedback data set from the wireless communication device;

acquire information indicating each possible combination of reception status of Downlink Control Information, DCI, and decoding status for associated Physical Downlink Shared Channel, PDSCH, data received at the wireless communication device for the number of DCIs being included with the downlink transmission, the information further indicating a multiplexed HARQ feedback data set transmitted by the wireless communication device for each of the combinations and whether or not there is ambiguity as to if one or more Negative Acknowledgements, NACKs, of a multiplexed HARQ feedback data set associated with each of the combinations is a result of failed decoding of PDSCH data or of non-reception of one or more DCIs utilized to schedule the PDSCH data at the wireless communication device;

determine whether the received multiplexed HARQ feedback data set includes one or more NACKs indicated to be ambiguous, and to in response to determining that the received multiplexed HARQ feedback data set includes one or more NACKs indicated to be ambiguous, compute, for each received NACK determined to indicate ambiguity, a weight indicating probability that the NACK is a result of failed decoding of PDSCH data, based on the acquired information.

14. The radio base station of claim 13, further being operative to, when computing the weight:

identify, from the acquired information, all multiplexed HARQ feedback data sets indicated to comprise one or more ambiguous NACKs;

group all identical multiplexed HARQ feedback data sets indicated to comprise one or more ambiguous NACKs in the same group; and compute the weight by determining, from the acquired information, a proportion of NACKs being the result of failed decoding at the wireless communication device for each ambiguous NACK in a grouped multiplexed HARQ feedback data set corresponding to the HARQ feedback data set received from the wireless communication device.

15. The radio base station of claim 14, further being operative to, when computing the weight by determining a proportion of NACKs being the result of failed decoding at the wireless communication device:

divide, for each ambiguous NACK entry in the grouped multiplexed HARQ feedback data set, number of NACKs for the grouped multiplexed HARQ feedback data sets by total number of NACKs being result of failed decoding of the PDSCH data and of non-reception of the one or more DCIs utilized to schedule the PDSCH data at the wireless communication device for the grouped multiplexed HARQ feedback sets.

16. The radio base station of claim 14, further being operative to perform separate groupings depending on whether HARQ feedback data sets are transported via Physical Uplink Shared Channel, PUSCH, or via Physical Uplink Control Channel, PUCCH.

17. The radio base station of claim 14, further being operative to identify possible HARQ feedback data sets further being a result of decoding errors at the radio base station and group these with said identical multiplexed HARQ feedback data sets.

18. The radio base station of claim 13, further being operative to, when determining if the received multiplexed HARQ feedback data set includes one or more NACKs indicated to be ambiguous:

determine that the multiplexed HARQ feedback data set is received via PUCCH;

determine PUCCH format being used for the received HARQ feedback data set, and if the PUCCH format is either 0 or 1:

determine that a number of DCIs utilized to schedule the PDSCH data being included in the downlink transmission is greater than one;

determine that a last number of the DCIs utilized to schedule the PDSCH data comprised in the downlink transmission, the number equaling the number of DCIs utilized to schedule the PDSCH data being transmitted minus 2, is not received at the wireless communication device;

determine that if only a single bit is received in the HARQ feedback data set, a first DCI utilized to schedule the PDSCH data in the downlink transmission is not ambiguous while the a second DCI utilized to schedule the PDSCH data is not received at the wireless communication device; and to determine that if a NACK is received followed by an Acknowledgement, ACK, indicating successful decoding of a DCI utilized to schedule the PDSCH data, the NACK is ambiguous, while if an ACK is followed by a NACK, both are received at the wireless communication device and the NACK is not ambiguous.

19. The radio base station of claim 18, further being operative to, if the PUCCH format is determined to be either 2, 3 or 4:

determine that if a number of bits included in the HARQ feedback data set equals the number of DCIs utilized to schedule the PDSCH data in the downlink transmission, the last DCI utilized to schedule the PDSCH data is not ambiguous but any NACK for the remaining DCIs utilized to schedule the PDSCH data is ambiguous; and determine that if the number of bits included in the HARQ feedback data set is less than the number DCIs utilized to schedule the PDSCH data in the downlink transmission:

a last number of the DCIs utilized to schedule the PDSCH data comprised in the downlink transmissions, the number equaling the number of DCIs utilized to schedule the PDSCH data being transmitted minus the number of bits included in the HARQ feedback data set, is not received at the wireless communication device;

the DCI utilized to schedule the PDSCH data at a position corresponding to the number bits included in the HARQ feedback data is not ambiguous; and all NACKS are ambiguous for the remaining DCIs utilized to schedule the PDSCH data.

20. The radio base station of claim 13, further being operative to, when determining if the received multiplexed HARQ feedback data set includes one or more NACKs indicated to be ambiguous:

determine that the multiplexed HARQ feedback data set is received via the PUSCH;

determine that if a number of DCIs utilized to schedule the PDSCH data being included in the downlink transmitted is less than five, all NACKs are ambiguous;

determine that if a number of DCIs utilized to schedule the PDSCH data being included in the downlink transmitted is five or more and a cyclic redundant check on the PUSCH is successful, all but one NACK are ambiguous in case only NACKs are received while if both ACKs and NACKs are received, all NACKs are ambiguous.

*    *    *    *    *